US007123229B2

(12) United States Patent
Toyozawa et al.

(10) Patent No.: US 7,123,229 B2
(45) Date of Patent: Oct. 17, 2006

(54) LIQUID CRYSTAL DISPLAY DEVICE AND PORTABLE TERMINAL DEVICE COMPRISING IT

(75) Inventors: Noboru Toyozawa, Kanagawa (JP); Yoshiharu Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 294 days.

(21) Appl. No.: 10/451,282

(22) PCT Filed: Oct. 7, 2002

(86) PCT No.: PCT/JP02/10410

§ 371 (c)(1),
(2), (4) Date: Jun. 19, 2003

(87) PCT Pub. No.: WO03/036604

PCT Pub. Date: May 1, 2003

(65) Prior Publication Data

US 2004/0066364 A1 Apr. 8, 2004

(30) Foreign Application Priority Data

Oct. 19, 2001 (JP) ............................ 2001-322218

(51) Int. Cl.
*G09G 3/36* (2006.01)
*G09G 5/00* (2006.01)
*G02F 1/136* (2006.01)

(52) U.S. Cl. .......................... 345/90; 345/98; 345/209; 349/41

(58) Field of Classification Search .................. 345/90, 345/92, 98, 93, 96, 99, 100, 209, 213; 349/41
See application file for complete search history.

(56) References Cited

U.S. PATENT DOCUMENTS

| | | | | |
|---|---|---|---|---|
| 5,712,652 | A * | 1/1998 | Sato et al. | 345/90 |
| 5,798,746 | A * | 8/1998 | Koyama | 345/98 |
| 5,903,234 | A * | 5/1999 | Kimura | 341/144 |
| 5,945,972 | A * | 8/1999 | Okumura et al. | 345/98 |
| 6,181,313 | B1 | 1/2001 | Yokota et al. | |
| 6,636,194 | B1 * | 10/2003 | Ishii | 345/98 |
| 6,771,247 | B1 * | 8/2004 | Sato et al. | 345/98 |
| 6,850,216 | B1 * | 2/2005 | Akimoto et al. | 345/90 |
| 6,853,371 | B1 * | 2/2005 | Miyajima et al. | 345/206 |
| 2002/0036627 | A1 * | 3/2002 | Yokohama | 345/204 |

FOREIGN PATENT DOCUMENTS

EP 0974952 1/2000

(Continued)

*Primary Examiner*—Henry N. Tran
(74) *Attorney, Agent, or Firm*—Robert J. Depke; Rockey, Depke, Lyons & Kitzinger LLC

(57) ABSTRACT

A liquid crystal display that is unsusceptible to the effect of a pixel potential during writing of data to a memory, allowing a large margin to be provided against variation in characteristics of transistors forming a pixel circuit, and a portable terminal having the liquid crystal display, serving to avoid variation in picture quality due to the variation in the transistor characteristics. In a pixel circuit including a memory circuit, separate paths are provided for writing image data from a signal line to the memory circuit via a data-write switch and for reading image data held in the memory circuit out into a liquid crystal cell unit via a data-read switch. Furthermore, image data are read via a data-read buffer. Accordingly, when image data is written to the memory, data held in the memory circuit is not affected by a pixel potential.

10 Claims, 11 Drawing Sheets

FOREIGN PATENT DOCUMENTS

| | | | |
|---|---|---|---|
| EP | 1020840 | | 7/2000 |
| EP | 1207513 | | 5/2002 |
| EP | 1213701 | | 6/2002 |
| EP | 1246159 | | 10/2002 |
| EP | 1249820 | | 10/2002 |
| JP | 58-23091 | | 8/1983 |
| JP | 07-253765 | | 10/1995 |
| JP | 09-212140 | A | 8/1997 |
| JP | 10-214063 | A | 8/1998 |
| JP | 2001-100707 | A | 4/2001 |
| JP | 2001-264814 | A | 9/2001 |
| JP | 2002-156922 | A | 5/2002 |
| JP | 2002-174824 | A | 6/2002 |
| JP | 2002-297082 | A | 10/2002 |
| JP | 2002-311904 | A | 10/2002 |
| WO | WO 99/40561 | A | 8/1999 |
| WO | WO 00/08625 | A | 2/2000 |

* cited by examiner

LIQUID CRYSTAL DISPLAY DEVICE AND PORTABLE TERMINAL DEVICE COMPRISING IT

This application claims priority to International Application No. PCT/JP02/10410, filed Oct. 7, 2002 and Japanese Patent Application No. JP2001-322218, filed Oct. 19, 2001, each of which are incorporated herein by reference.

TECHNICAL FIELD

The present invention relates to liquid crystal displays and portable terminals having the same, and more specifically, it relates to a liquid crystal display having a memory for each pixel and to a portable terminal in which the liquid crystal display is used as an output display.

BACKGROUND ART

A liquid crystal display displays images by changing arrangement of liquid crystal molecules by applying and withdrawing an electric field and thereby controlling transmission/blocking of light. The liquid crystal display, in principle, does not require a large amount of power for driving, and it is a display device with a low power consumption, in which power consumption is maintained small. Thus, liquid crystal displays are widely used as output displays of portable terminals, particularly those mainly powered by batteries, such as cellular phones and PDAs (personal digital assistants).

In a liquid crystal display for this type of application, in order to allow use of a battery for a long period by a single charging, attempts have been made to reduce power consumption by lowering the driving voltage or by lowering the driving frequency. Furthermore, as a pixel structure that allows further reduction in power consumption, a liquid crystal display in which a memory is provided for each pixel is known (for example, refer to Japanese Unexamined Patent Application Publication No. 9-212140).

In such a liquid crystal display of a pixel structure in which a memory is provided for each pixel, with regard to a still picture, once image data is written to a memory unit of a pixel, it suffices to repeatedly drive the pixel for display using the image data stored in the memory of the pixel. Thus, signal lines need not be charged and discharged on each occasion, and in principle, the only electric power required is that for inverting polarity. This allows further reduction in power consumption.

In the liquid crystal display having the construction described above, the arrangement has hitherto been such that the same path is used for writing image data from a signal line to a memory unit of a pixel and for reading image data out of the memory into a liquid crystal cell unit at the pixel. Thus, when image data is written to the memory, since the liquid crystal cell unit is connected to a write line and the pixel capacitance is charged, the potential of the liquid crystal cell unit (hereinafter referred to as pixel potential) becomes unstable, affecting the write operation. Consequently, depending on characteristics of transistors forming the pixel circuit, data held in the memory might be modified by the pixel potential, causing considerable variation in picture quality due to the variation in the transistor characteristics.

The present invention has been made in view of the above problem, and an object thereof is to provide a liquid crystal display in which the effect of a pixel voltage during writing of data to a memory is removed, serving to provide a large margin against variation in characteristics of transistors forming a pixel circuit, and to provide a portable terminal having the liquid crystal display.

DISCLOSURE OF THE INVENTION

In a liquid crystal display according to the present invention, or in a portable terminal in which the liquid crystal display is used as an output display, a digital image signal is written from the signal line to the memory via the read switch, while a digital image signal is read out of the memory into the liquid crystal cell unit via the read buffer. That is, separate paths are used for writing a digital image signal to the memory and for reading a digital image signal from the memory. Thus, when a digital image signal is written to the memory, the write operation is not affected by the pixel potential. Furthermore, when an analog image signal is directly written from the signal line to the liquid crystal cell unit, writing to the memory is inhibited by operation of the read buffer disposed between the memory and the liquid crystal cell unit.

BEST MODE FOR CARRYING OUT THE INVENTION

Figure 1:
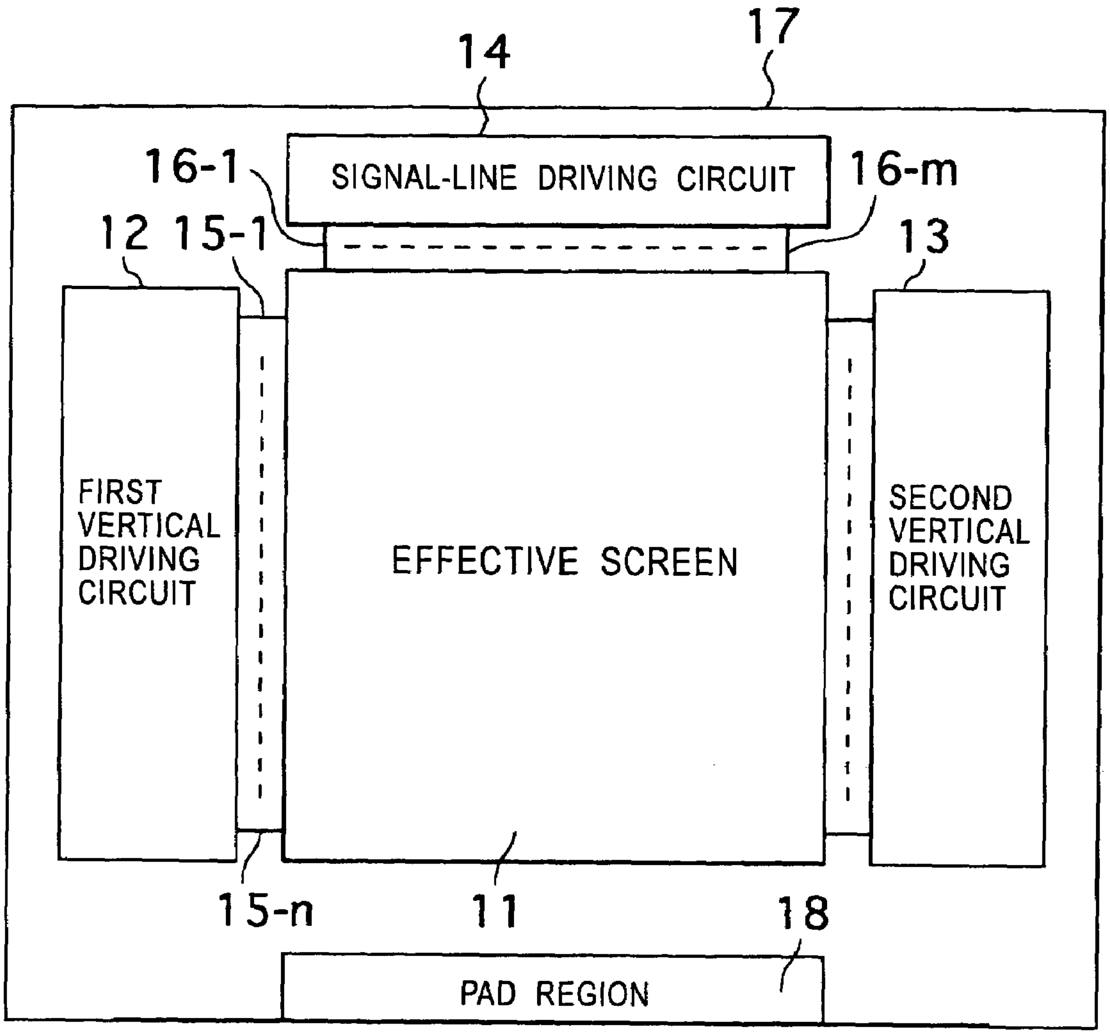
FIG. 1 is a block diagram showing a schematic overall construction of a liquid crystal display according to an embodiment of the present invention.

Now, embodiments of the present invention will be described in detail with reference to the drawings. FIG. 1 is a block diagram showing a schematic overall construction of a liquid crystal display according to an embodiment of the present invention.

As is apparent from FIG. 1, the liquid crystal display according to this embodiment includes a pixel region 11 where pixel circuits including liquid crystal cell units are arranged in a matrix, first and second vertical driving circuits 12 and 13 for selectively driving the pixel circuits in the pixel region 11 on a row-by-row basis, and a signal-line driving circuit 14 for feeding image signals, on a column-by-column basis, to pixel circuits on rows selectively driven by the vertical driving circuits 12 and 13. In the pixel region 11, for an array of n-rows-by-m-columns pixels, scanning lines 15-1 to 15-n and m signal lines 16-1 to 16-m are wired in a matrix, and the pixel circuits are disposed at the intersections thereof.

The first and second vertical driving circuits 12 and 13 and the signal-line driving circuit 14 are implemented in what is called an integrated driving circuit arrangement, that is, integrally formed on a substrate (hereinafter referred to as a liquid crystal display panel) 17 on which the pixel region 11 is formed. More specifically, the first and second vertical driving circuits 12 and 13 are disposed separately on the left and right sides of the pixel region 11. The signal-line driving circuit 14 is disposed, for example, on an upper side of the pixel region 11. Furthermore, a pad region 18 is provided in a lower-edge region of the liquid crystal display panel 17.

The liquid crystal display panel 17 is formed of a TFT substrate having thereon switching elements for the respective pixel circuits, such as thin-film transistors (TFTs), an opposing substrate having color filters and opposing electrodes, these substrates being laminated with each other, and liquid crystal encapsulated between the substrates. In the pixel region 11, switching of the TFTs or the respective pixel circuits is controlled on a row-by-row basis by the first and second vertical driving circuits 12 and 13, and voltages are applied according to image signals fed from the signal-line driving circuit 14 via the signal lines 16-1 to 16-m, whereby the orientation of the liquid crystal is controlled to change transmittance of light, allowing display of images.

The signal-line driving circuit 14 outputs AC analog image signals to the signal lines 16-1 to 16-m. The AC-driven analog image signals herein refer to analog image signals whose polarity is inverted at a cycle with respect to a center at a common voltage VCOM (signal center) in order to avoid degradation in the resistivity (specific resistance of a material), etc. of the liquid crystal due to continuous application of DC voltages of the same polarity to the liquid crystal.

Driving by the AC-driven analog image signals can be broadly classified into 1F-inversion driving (1F refers to a field period) and 1H-inversion driving (1H refers to a horizontal scanning period). In 1F-inversion driving, the polarity of analog image signals is inverted when analog image signals of a polarity have been written to all the pixels. In 1H-inversion driving, the polarity of analog image signals is inverted on a line-by-line (row-by-row) basis, and further inverted on a field-by-field basis.

The AC analog image signals output from the signal-line driving circuit 14 to the signal lines 16-1 to 16-m are signals for a normal display. In the liquid crystal display according to this embodiment, in addition to the analog image signals, the signal-line driving circuit 14 also outputs digital image data for a still picture to the signal lines 16-1 to 16-m.

[Pixel Circuits]

Figure 2:
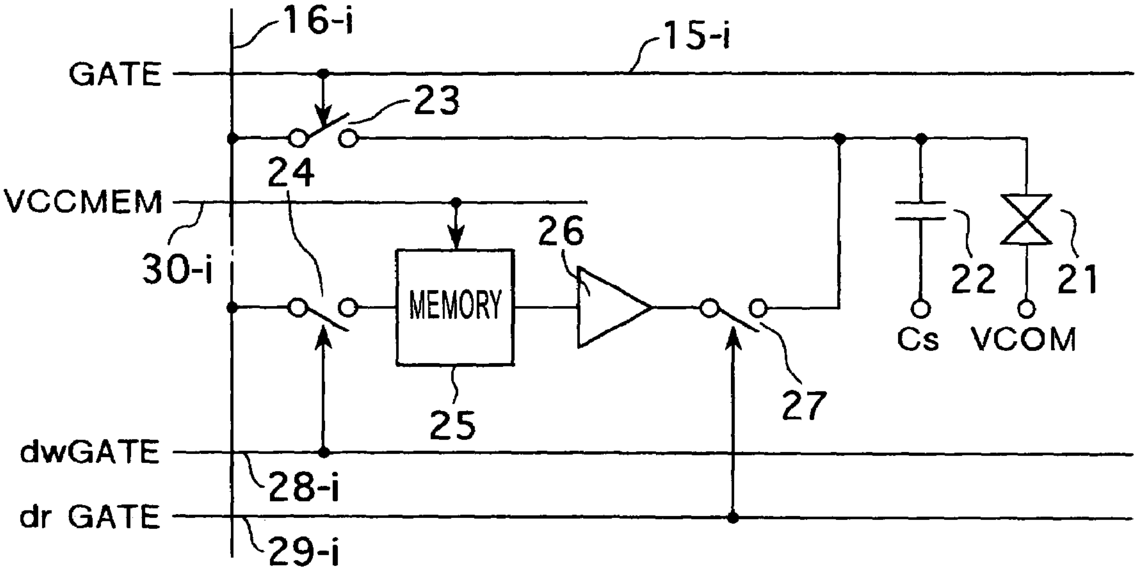
FIG. 2 is a circuit diagram showing an example configuration of a pixel circuit on an i-th row and i-th column.

FIG. 2 is a circuit diagram showing an example configuration of a pixel circuit on an i-th row and i-th column. The pixel circuit includes a liquid crystal cell 21, a hold capacitor 22, a pixel-select switch 23, a data-write switch 24, a memory circuit 25, a data-read buffer 26, and a data-read switch 27.

The liquid crystal cell 21 and the hold capacitor 22, with first ends thereof commonly connected, form a liquid crystal cell unit. To a second end of the liquid crystal cell 21, the common voltage VCOM is applied, and to a second end of the hold capacitor 22, a voltage Cs whose polarity is inverted at a cycle of 1H (or 1F) is applied. The pixel-select switch 23 has a first end connected to the signal line 16-i and a second end connected to the first ends of the liquid crystal cell 21 and the hold capacitor 22. The pixel-select switch 23 is driven by a scanning signal GATE that is provided via the scanning line 15-i to write an analog image signal to the liquid crystal cell unit.

The data-write switch 24 has a first end connected to the signal line 16-i and a second end connected to an input terminal of the memory circuit 25. The data-write switch 24 is driven by a write-control signal dwGATE that is provided via a data-write control line 28-i to write digital image data to the memory circuit 25. The digital image data written to the memory circuit 25 (hereinafter also referred to simply as memory data) is read via the read buffer 26.

The data-read switch 27 has a first end connected to an output terminal of the read buffer 26 and a second end connected to the first ends of the liquid crystal cell 21 and the hold capacitor 22. The data-read switch 27 is driven by a data-read control signal drGATE that is provided via a data-read control line 29-i to write digital image data read from the memory circuit 25 via the read buffer 26 to the liquid crystal cell unit. To the memory circuit 25, a power supply voltage VCCMEM is fed via a power-supply control line 30-i.

Next, a specific example of the pixel circuit configured as described above will be described.

(First Example Circuit)

Figure 3:
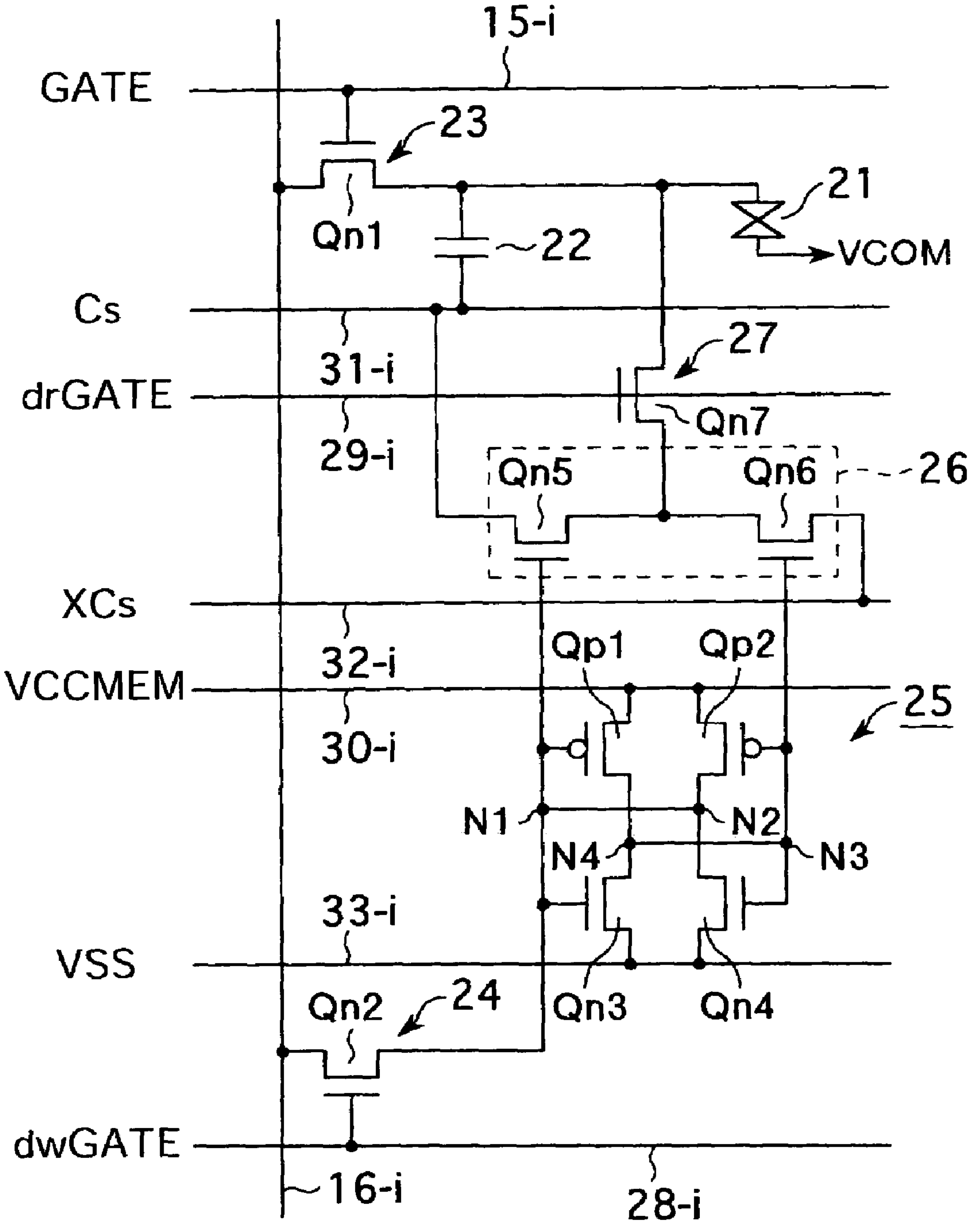
FIG. 3 is a circuit diagram showing a first example of the pixel circuit.

FIG. 3 is a circuit diagram showing a first example of the pixel circuit. Referring to FIG. 3, in the pixel circuit, in addition to the scanning line 15-i, the data-write control line 28-i, the data-read control line 29-i, and the power-supply control line 30-i, a Cs line 31-i for providing a potential Cs having the same polarity as that of the opposing electrode of the liquid crystal cell 21 (opposing voltage), an XCs line 32-i for providing a potential XCs having a polarity opposite to that of the potential Cs, and a negative-power-supply line 33-i for feeding a negative power-supply voltage VSS to the memory circuit 25 are wired on a row-by-row basis.

The pixel-select switch 23 is implemented by a NchTFT (hereinafter referred to as a pixel-select TFT) Qn1 having a gate connected to the scanning line 15-i, a source connected to the signal line 16-i, and a drain connected to the first ends of the liquid crystal cell 21 and the hold capacitor 22. The data-write switch 24 is implemented by a NchTFT (hereinafter referred to as a data-write TFT) Qn2 having a gate connected to the data-write control line 28-i and a source connected to the signal line 16-i.

The memory circuit 25 is an SRAM formed of a first inverter implemented by a PchTFT Qp1 and an NchTFT Qn3 connected in series between the power-supply control line 30-i and the negative-power-supply line 33-I and having gates commonly connected, and a second inverter similarly implemented by a PchTFT Qp2 and an NchTFT Qn4 connected in series between the power-supply control line 30-i and the negative-power-supply line 33-i and having gates commonly connected, wherein an input node N1 of one of the inverters is connected to an output node N2 of the other inverter and an input node N3 of the other inverter is connected to an output node N4 of the one of the inverters. The input node N1 is connected to the drain of the TFT Qn2.

The data-read buffer 26 is implemented by an NchTFT Qn5 having a gate connected to the output node N2 of the memory circuit 25 and a source connected to the Cs line 31-i, and an NchTFT (hereinafter referred to as a data-read TFT) Qn6 having a gate connected to the other output node N4 of the memory circuit 25 and a source connected to the XCs line 32-i, with the drains of the transistors Qn5 and Qn6 commonly connected.

The data-read switch 27 is implemented by an NchTFT (hereinafter referred to as a data-read TFT) Qn7 having a gate connected to the data-read control signal 29-i, a source connected to a common node between the drains of the transistors Qn5 and Qn6, and a drain connected to the first ends of the liquid crystal cell 21 and the hold capacitor 22.

Thus, each of the pixel circuits has nine transistors (namely, TFTs Qp1 and Qp2, and TFTs Qn1 to Qn7), and eight wires (namely, scanning line 15-i, signal line 16-i, data-write control line 28-i, data-read control signal 29-i, power-supply control line 30-i, Cs line 31-i, XCs line 32-i, and negative-power-supply line 33-i).

Figure 4:
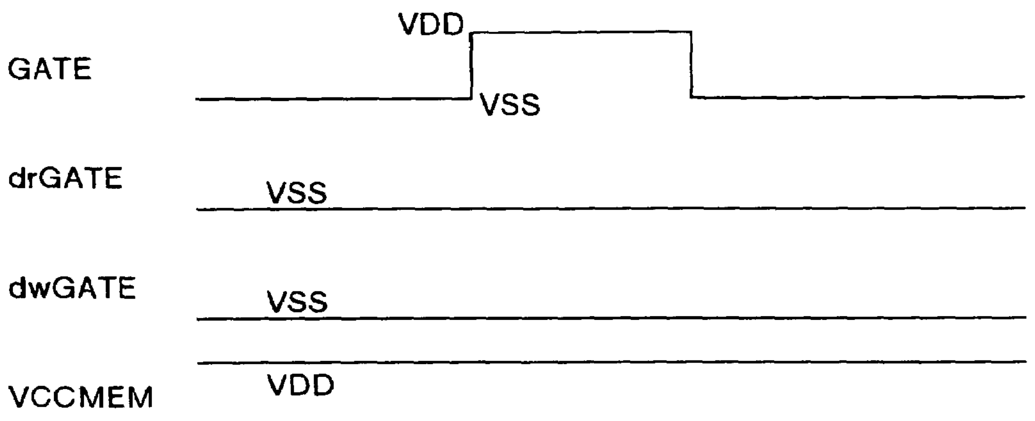
FIG. 4 is a timing chart for writing of an analog image signal to a memory circuit.
Figure 5:
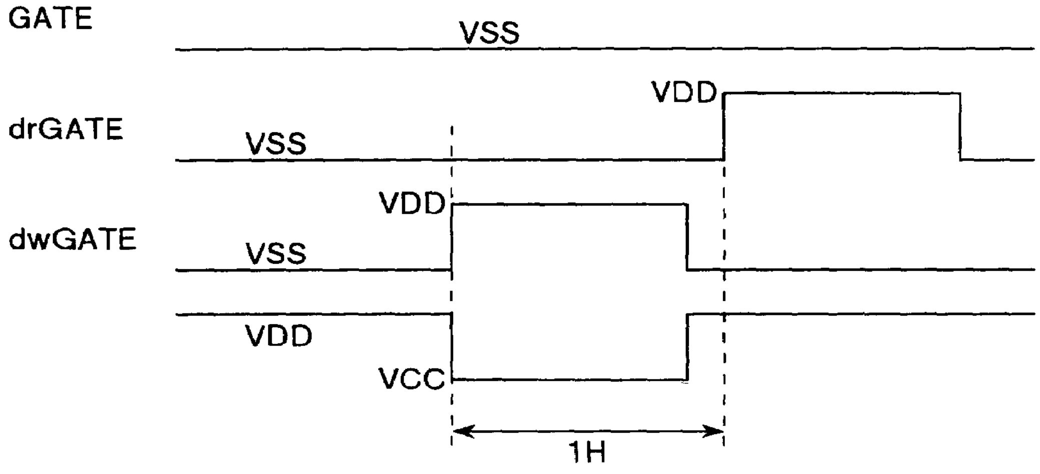
FIG. 5 is a timing chart for writing of image data to the memory circuit.
Figure 6:
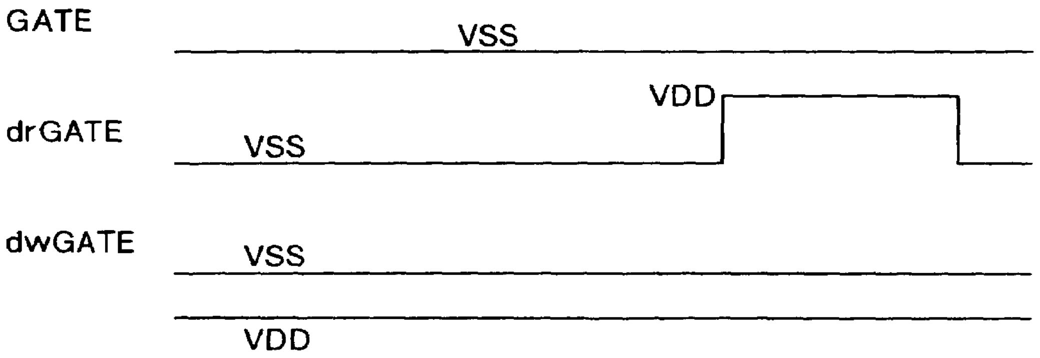
FIG. 6 is a timing chart for reading of image data from the memory circuit.

Next, operations of the first example of the pixel circuit, configured as described above, will be described with reference to timing charts shown in FIGS. 4 to 6. FIG. 4 is a timing chart for writing of an analog image signal to the liquid crystal cell unit. FIG. 5 is a timing chart for writing of digital image data to the memory circuit 25. FIG. 6 is a timing chart for reading of digital image data from the memory circuit 25.

First, an operation for writing an analog image signal will be described with reference to the timing chart shown in FIG. 4. During this write operation, the scanning signal GATE is set to high level (VDD level). Accordingly, the pixel-select TFT Qn1 is turned on, so that an analog image signal fed from the signal-line driving circuit 14 (refer to FIG. 1) via the signal line 16-i is written via the pixel-select TFT Qn1 to the liquid crystal cell unit formed of the liquid crystal cell 21 and the hold capacitor 22.

At this time, the data-read control signal drGATE and the data-write control signal dwGATE are both set to low level (VSS level), whereby the data-read TFT Qn7 and the data-write TFT Qn2 are both turned off. Thus, image data is not written to the memory circuit 25 or read from the memory circuit 25. The positive power-supply voltage VCCMEM is set to VDD level.

Next, an operation for writing digital image data will be described with reference to the timing chart shown in FIG. 5. During this write operation, the scanning signal GATE is set to low level (VSS level), whereby the pixel-select TFT Qn1 is turned off. Then, at a normal timing of pixel selection, the data-write control signal dwGATE is set to high level (VDD level). Accordingly, the data-write TFT Qn2 is turned on, so that digital image data fed from the signal-line driving circuit 14 via the signal line 16-i is written to the memory circuit 25 via the data-write TFT Qn2. The digital image data is image data of a still picture, for example, a one-bit signal.

The data write operation uses a sequence in which the positive power-supply voltage VCCMEM on the power-supply control line 30-i of the memory circuit (SRAM) 25 is once lowered from a panel-circuitry driving voltage at VDD level to the potential of the signal line 16-I at VCC level, and raised back to VDD level after data has been written to the memory circuit 25. By using this sequence, VDD level is used as a memory-holding voltage, so that a large margin is provided against fluctuation or the like associated with the opposing voltage when data is held in the memory circuit 25.

To describe the sequence in more detail, for example, assuming that the amplitude (VSS-VCC) of the image data fed from the signal line 16-i is 0V–3V, if the image data is held in the memory circuit 25 with that amplitude, i.e., with VSS=0V and VCCMEM=3V, the polarity of the data held is inverted if the opposing voltage fluctuates. For this reason, if the data is held in the memory circuit 25 with an amplitude larger than the amplitude of the data written, for example, with 0V–7V (VDD level), a large margin is provided for holding data against fluctuation or the like associated with the opposite voltage.

However, if the positive power-supply voltage VCCMEM of the memory circuit 25 is maintained at VDD level (7V), letting a threshold voltage of the TFTs forming the memory circuit 25 be denoted by Vth, image data having an amplitude not greater than V-Vth cannot be written to the memory circuit 25. Thus, when image data of 0–3 V is written, the positive power-supply voltage VCCMEM is once lowered from VDD level (7V) to VCC level (3V). Accordingly, image data of 0–3 V is input to the memory circuit 25 with VSS=0V and VCCMEM=3V, allowing the image data to be written at that instance.

When the image data has been written, the positive power-supply voltage VCCMEM is restored to VDD level, so that the amplitude of the image data written is shifted from VSS-VCC to VSS-VDD. That is, VDD level is used as a holding voltage in the memory circuit 25, allowing a large margin against fluctuation or the like associated with the opposing voltage.

When the digital image data has been written to the memory circuit 25, the data-read control signal drGATE is set to high level in the next 1H period, whereby the data-read TFT Qn7 is turned on. Accordingly, image data is read from the memory circuit 25 via the data-read buffer (Qn5 and Qn6) 26, and then written to the liquid crystal cell unit via the data-read TFT Qn7 in the form of a pixel potential.

Now, operation of the data-read TFT Qn7 will be described. When the data-read TFT Qn7 is turned on, image data held in the memory circuit 25 is read via the data-read buffer 26. At this time, the image data is stored in the memory circuit 25 either at high (H) level or at low (L) level.

Thus, the data-read buffer (Qn5 and Qn6) 26 converts the image data read from the memory circuit 25 into the potential Cs or XCs, the polarity being changed at a cycle of 1H (or 1F), and the constant potential is written to the liquid crystal cell unit via the data-read TFT Qn7 as a pixel potential. This allows an operation with the timing of 1H inversion (or 1F inversion). When the data has been written, the data-read TFT Qn7 is turned off, causing an open state (high-impedance state) between the output terminal of the data-read buffer 26 and the liquid crystal cell unit.

By using the above sequence, a display by writing an analog signal in, for example, 260 thousand colors (six bits) and a display by writing memory data in eight colors (one bit) can be combined in a single screen. Thus, in a partial display mode in which a region in eight colors in an analog signal has hitherto been displayed in white, a still picture in eight colors can be displayed based on memory data. Furthermore, the memory circuit 25 eliminates the need of charging and discharging the signal lines 16-1 to 16-m each time a still picture is displayed, serving to reduce power consumption.

When an analog image signal has been written to the liquid crystal cell unit, usually, the pixel-select TFT Qn1 is off. Thus, if the polarity of the common voltage VCOM is inverted at a cycle of 1H (or 1F), the pixel potential changes accordingly. When digital image data held in the memory circuit 25 (memory data) is written to the liquid crystal cell unit, assuming that the data-read TFT Qn7 is absent, the first ends of the liquid crystal cell 21 and the hold capacitor 22 are connected to the potentials Cs and XCs at low impedances.

Thus, in a display based on memory data, even if the polarity of the common voltage VCOM changes at a cycle of 1H (or 1F), the pixel potential does not change, in contrast to the case of writing an analog image signal. This indicates that the common voltage VCOM that serves as a signal center differs between a display based on an analog image signal and a display based on memory data.

In contrast, in the above example circuit, the data-read TFT Qn7 is provided, and the data-read TFT Qn7 is turned off when memory data has been written to the liquid crystal cell unit, causing a high-impedance state between the liquid crystal cell unit and the potentials Cs and XCs. Accordingly, in a display based on memory data as well as a display based on an analog image signal, the pixel potential changes in synchronization with inversion of the polarity of the common voltage VCOM. Thus, the common voltage VCOM does not differ between a display based on an analog image signal and a display based on memory data.

As described above, in the pixel circuit including the memory circuit 25, separate paths are provided for writing image data to the memory circuit 25 from the signal line 16-i and for reading image data out of the memory circuit 25 into the liquid crystal cell unit, and when data is read, memory data is read via the data-read buffer 26. Accordingly, the effect of the pixel potential on the data in the memory circuit 25 is removed, so that memory data is prevented from being modified due to the effect. Thus, a large margin is provided for the TFTs forming the pixel circuit.

Although the first example of the pixel circuit has been described in the context of an example where one pixel circuit includes one memory circuit 25 and an image based on an analog signal and an image based on memory data are displayed in combination, the arrangement may be such that a single pixel is divided into n regions and memory circuits are provided for the respective regions to allow n-bit multi-scale display. However, if the first example of the pixel circuit, i.e., the pixel circuit having nine transistors and eight wires, is used for each of the n bits, the circuitry scale becomes very large particularly due to the large number of transistors. As a countermeasure against the above problem, a second example circuit will be described below.

(Second Example Circuit)

Figure 7:
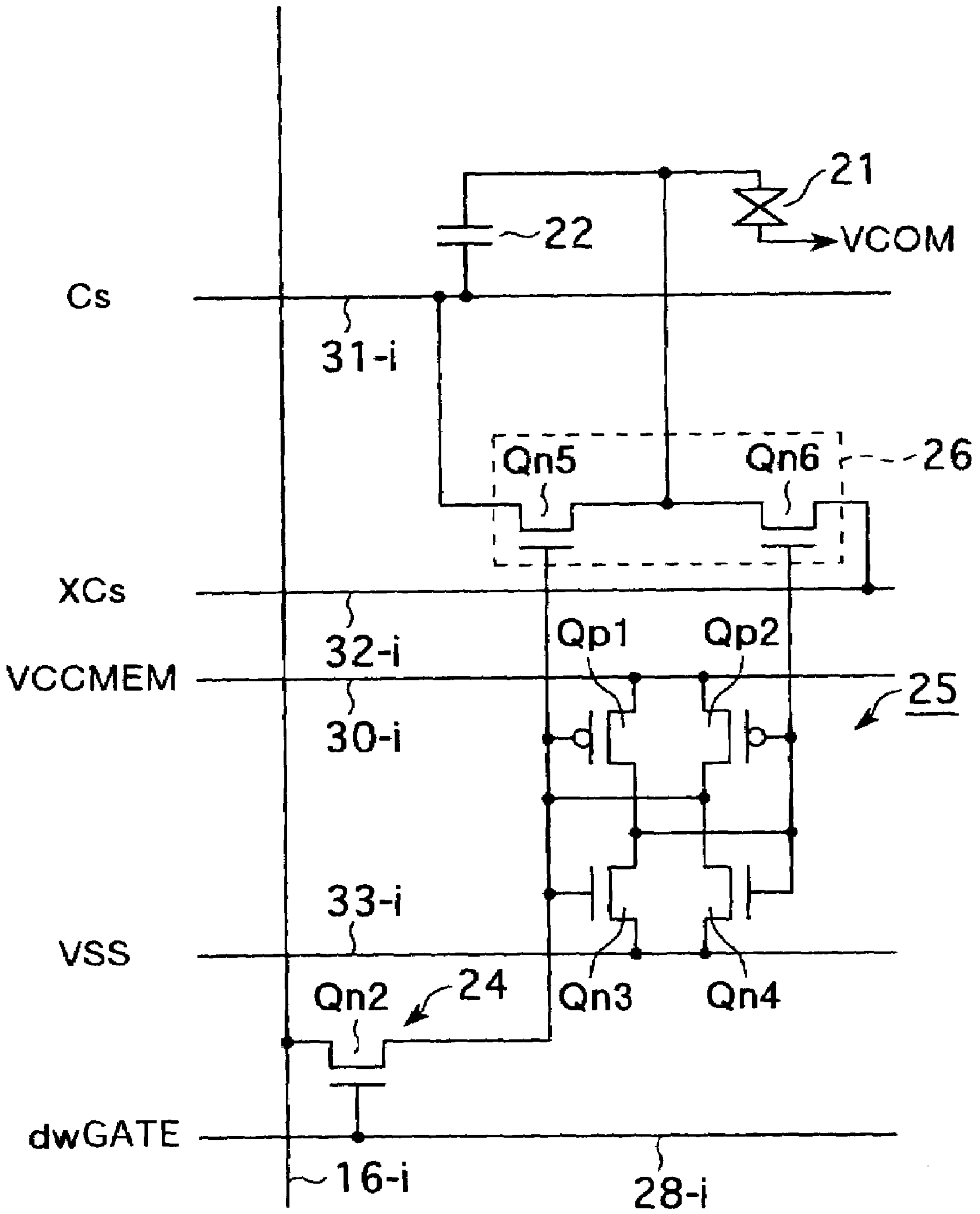
FIG. 7 is a circuit diagram showing a second example of the pixel circuit.

FIG. 7 is a circuit diagram showing a second example of the pixel circuit. The example circuit is a configuration for one bit in a pixel circuit having memory circuits for n bits as described above. In the second example of the pixel circuit, as opposed to the first example of the pixel circuit in which an image based on an analog image signal and an image based on memory data are displayed in combination, only an image based on memory data is displayed. Thus, the pixel-select TFT Qn1 for writing an analog image signal is not needed. Furthermore, as is apparent from the operation of the data-read TFT Qn7 described earlier, the data-read TFT Qn7 for matching of the common voltage VCOM can be omitted.

That is, as is apparent from a comparison between the pixel circuit shown in FIG. 3 and the pixel circuit shown in FIG. 7, two transistors and two wires can be omitted for one bit. Thus, assuming a pixel circuit having memory circuits for n bits, compared with a case where the pixel circuit shown in FIG. 3 is used, in which 8×n transistors are required, in a case where the pixel circuit shown in FIG. 7 is used, 6×n transistors suffice, allowing considerable reduction in the scale of pixel circuits.

[Vertical Driving System]

A vertical driving system for selectively driving the pixels (pixel circuits) in the pixel region 11 on a row-by-row basis includes the first vertical driving circuit 12 and the second vertical driving circuit 13, as is apparent from FIG. 1. Each of the vertical driving circuits 12 and 13 is in charge of driving two of the four wires of the pixel circuit shown in FIG. 2, namely, the scanning line 15-i, the data-write control line 28-i, the data-read control line 29-i, and the power-supply control line 30-i. More specifically, the first vertical driving circuit 12 is in charge of driving the scanning line 15-i and the data-read control line 29-i, and the second vertical driving circuit 13 is in charge of driving the data-write control line 28-i and the power-supply control line 30-i. Specific circuit configurations of the first vertical driving circuit 12 and the second vertical driving circuit 13 will be described below.

(First Vertical Driving Circuit 12)

Figure 8:
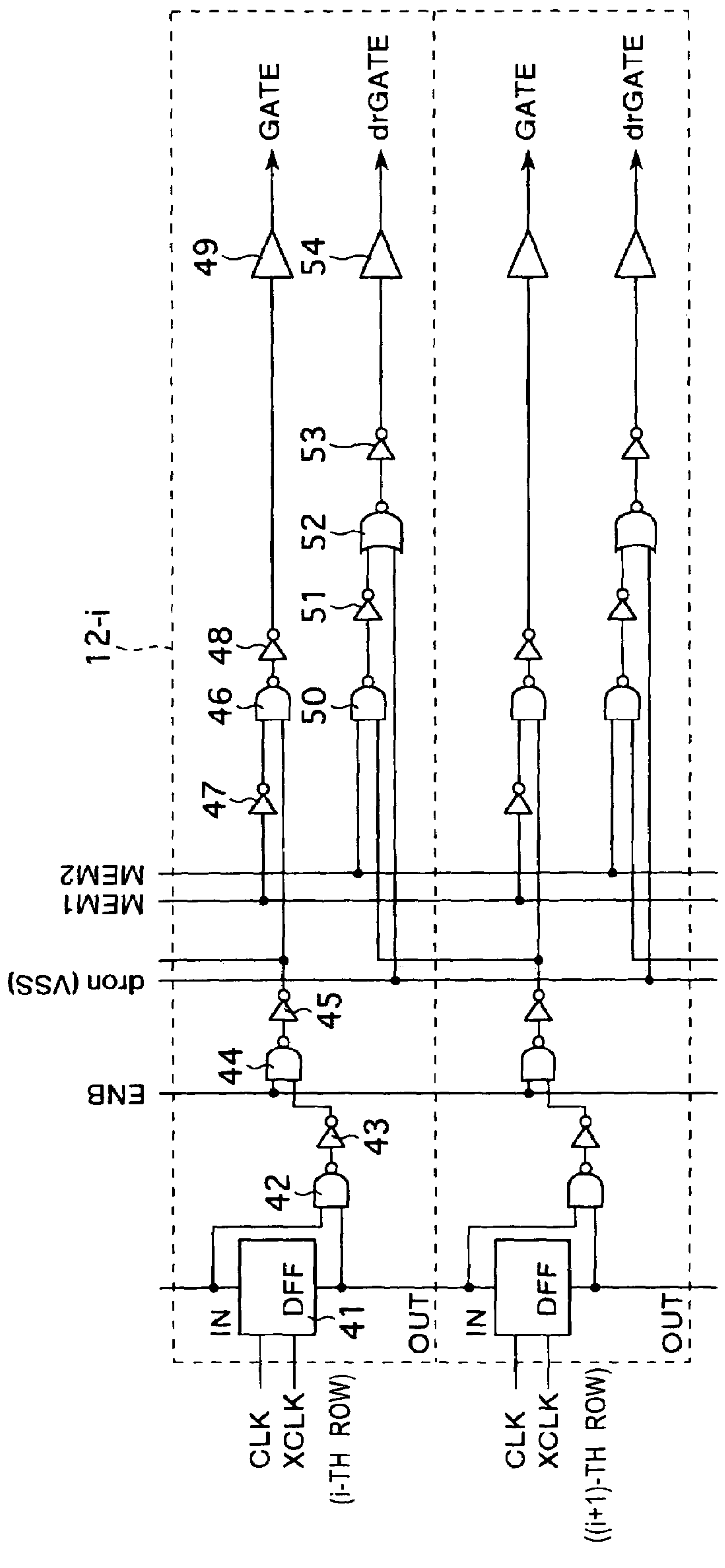
FIG. 8 is a block diagram showing a specific example configuration of a first vertical driving circuit.

FIG. 8 is a block diagram showing an example circuit configuration of the first vertical driving circuit 12. For simplicity of the figure, the configuration of circuit portions of the i-th and (i+1)-th rows are shown, and the circuit configuration will be described below, by way of example, only in relation to a circuit portion 12-i of the i-th row.

D flip-flops (D-FFs) 41 are disposed in one-to-one association with the respective rows. The D-FFs 41 of the respective rows are cascaded with each other, forming a shift register that transfers a pulse transferred from a previous stage to a subsequent stage in synchronization with clocks CLK and XCLK having mutually opposite phases. A pulse before transfer, input to the D-FF 41, and a pulse after transfer, output from the D-FF 41, are fed to a NAND gate 42 as two inputs thereof.

The output of the NAND gate 42, after being inverted by an inverter 43, is fed to one of the inputs of a NAND gate 44. To the other input of the NAND gate 44, an enable signal ENB commonly fed to the rows is fed. The output of the NAND gate 44, after being inverted by an inverter 45, is fed to one of the inputs of a NAND gate 46. To the other input of the NAND gate 46, a memory-data read-control signal MEM1 commonly fed to the rows, after being inverted by an inverter 47, is fed. The output of the NAND gate 46, after being inverted by an inverter 48, is fed to the scanning line 15-i shown in FIG. 2 via a buffer 49 as the scanning signal GATE.

A NAND gate 50 has two inputs, namely, a memory-data read-control signal MEM2 commonly fed to the rows, and the output of the inverter 45 on the next row ((i+1)-th row). The output of the NAND gate 50, after being inverted by an inverter 51, is fed to one of the inputs of a NOR gate 52. To the other input of the NOR gate 52, a control signal (VSS level) dron commonly fed to the rows is fed. The output of the NOR gate 52, after being inverted by an inverter 53, is fed to the data-read control line 29 shown in FIG. 2 via a buffer 54 as the data-read control signal drGATE.

(Second Vertical Driving Circuit 13)

Figure 9:
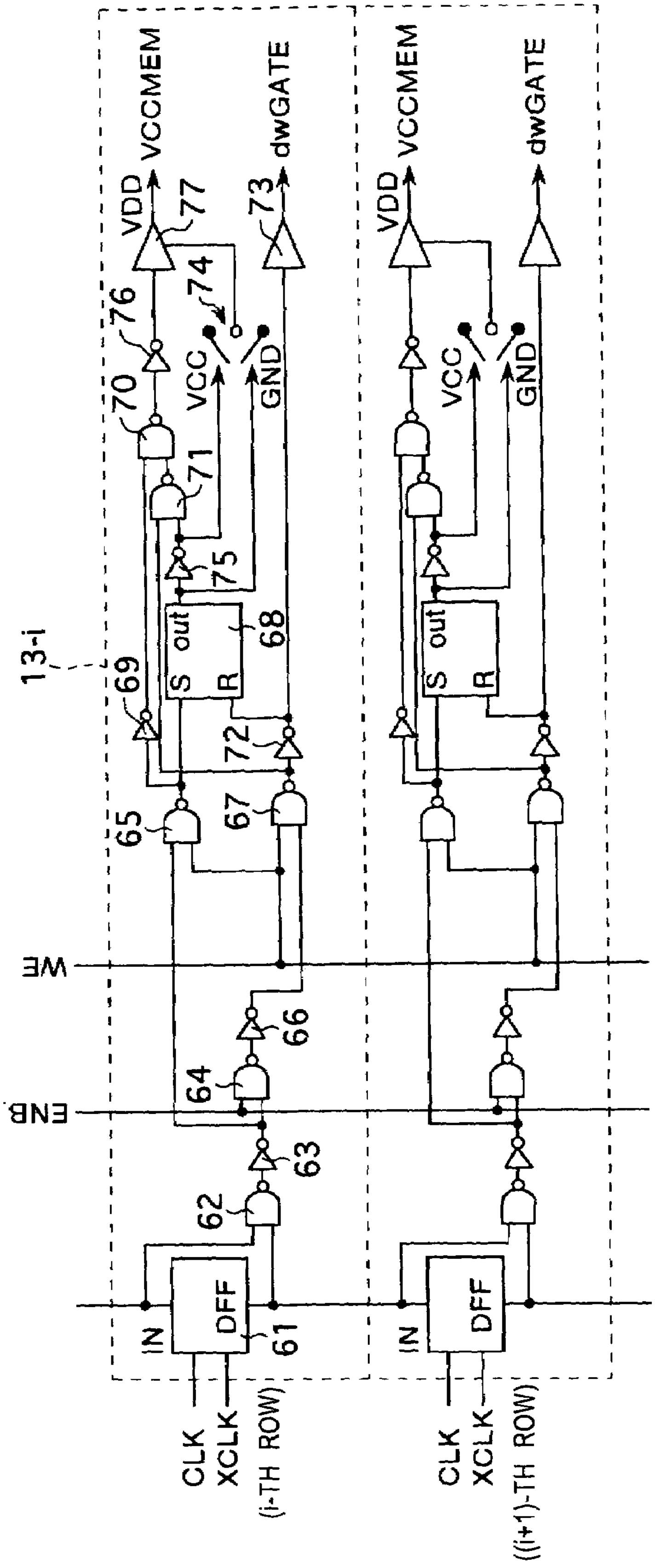
FIG. 9 is a block diagram showing a specific example configuration of a second vertical driving circuit.

FIG. 9 is a block diagram showing a specific example configuration of the second vertical driving circuit 13. For simplicity of the figure, only circuit portions of the i-th row and the (i+1)-th row are shown, and the circuit configuration will be described below, by way of example, only in relation to a circuit portion 13-i of the i-th row.

D-FFs 61 are disposed in one-to-one association with the respective rows. The D-FFs 61 of the respective rows are cascaded with each other, forming a shift register that transfers a pulse transferred from a previous stage to a subsequent stage in synchronization with clocks CLK and XCLK having mutually opposite phases. A pulse before transfer, input to the D-FF 61, and a pulse after transfer, output from the D-FF 61, are fed to a NAND gate 62 as two inputs thereof.

The output of the NAND gate 62, after being inverted by an inverter 63, is fed to one of the inputs of each of NAND gates 64 and 65. To the other input of the NAND gate 64, an enable signal ENB commonly fed to the rows is fed. The output of the NAND gate 64, after being inverted by an inverter 66, is fed to one of the inputs of a NAND gate 67. To the other inputs of the NAND gates 65 and 67, a memory-data write-control signal WE commonly fed to the rows is fed.

The output of the NAND gate 65 is used as the SET (S) input of an R-S flip-flop 68, and after being inverted by an inverter 69, it is fed to one of the inputs of a NAND gate 70. The output of the NAND gate 67 serves as one of the inputs of a NAND gate 71, and after being inverted by an inverter 72, it is used as the RESET (R) input of the R-S flip-flop 68. The output of the NAND gate 67 is also fed to the data-write control line 28-i shown in FIG. 2 via a buffer 73 as the data-write control signal dwGATE.

The output of the R-S flip-flop 68 is fed to a power-supply switch 74 as a selection signal for selecting GND level, and after being inverted by an inverter 75, it is fed to the power-supply switch 74 as a selection signal for selecting VCC level and is also fed to the other input of the NAND gate 71. The output of the NAND gate 71 is fed to the other input of the NAND gate 70. The output of the NAND gate 70, after being inverted by an inverter 76, is fed to the power-supply control line 30-i shown in FIG. 2 via a buffer 77 as the positive power-supply voltage VCCMEM.

To the buffer 77, a positive power-supply voltage at VDD level is fed, and VCC level or GND (VSS) level is selectively supplied according to switching by the power-supply switch 74. Thus, the positive power-supply voltage VCCMEM fed to the power-supply control line 30-i selectively takes on the three levels, namely, VDD level, VCC level, and GND (VSS) level.

Next, operations of the first vertical driving circuit 12 and the second vertical driving circuit 13 will be described with reference to timing charts shown in FIGS. 10 to 12.

Figure 10:
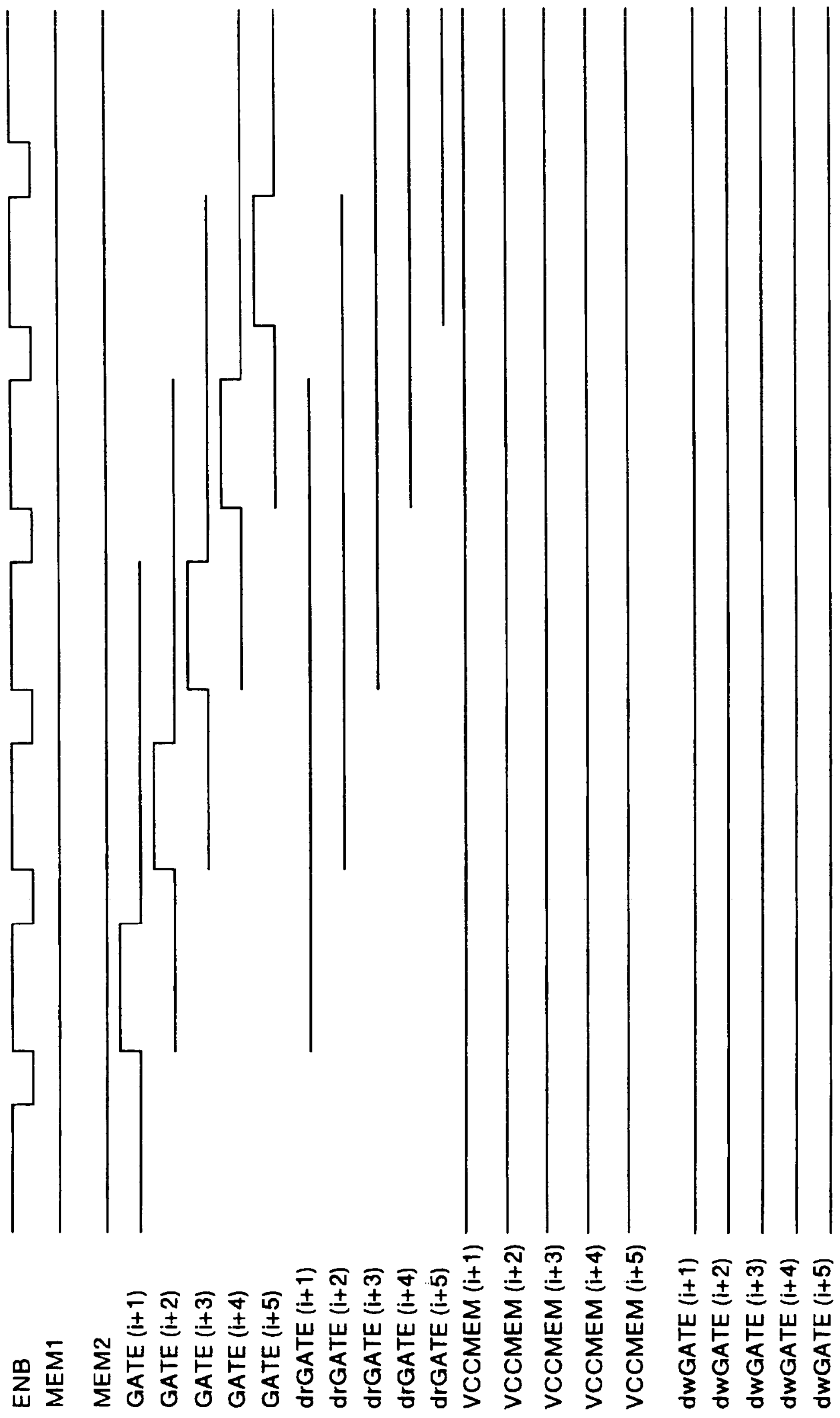
FIG. 10 is a timing chart for writing of an analog signal over an entire screen in an analog-signal display.

FIG. 10 is a timing chart for writing of an analog signal over the entire screen in an analog-signal display {GATE (i+1) to GATE(i+5)}. FIG. 11 is a timing chart for holding of memory data in a combined display of an analog-signal display {up to GATE(i+1), and from GATE(i+5)} and a memory-data display {GATE(i+2) to GATE(i+4)}. FIG. 12 is a timing chart for writing of memory data in a combined display of an analog-signal display {up to GATE(i+1), and from GATE(i+5)} and a memory-data display {GATE(i+2) to GATE(i+4)}.

First, an operation for writing an analog signal will be described with reference to the timing chart shown in FIG. 10. The memory-data read-control signals MEM1 and MEM2 and the memory-data write control signal WE are all set to low level (hereinafter referred to as "L" level). Accordingly, the first vertical driving circuit 12 sequentially outputs scanning signals GATE in synchronization with shift operations (transfer operations) of the shift register implemented by the cascaded D-FFs 41. Furthermore, the data-read control signal drGATE is set to "L" level. Accordingly, in the second vertical driving circuit 13, the data-write control signal dwGATE is set to "L" level, and the positive power-supply voltage VCCMEM is pulled to VDD level.

Thus, in the pixel circuit including the memory, shown in FIG. 2, the data-write switch 24 and the data-read switch 27 are both turned off (open). Accordingly, image data is not written from the signal line 16-i to the memory circuit 25, and memory data is not read out of the memory circuit 25 into the liquid crystal cell unit, and only an analog image signal can be to the liquid crystal cell unit on a row-by-row basis via the pixel-select switch 23 turned on (closed) in response to the scanning signal GATE.

Next, an operation for reading memory data will be described with reference to the timing chart shown in FIG. 11. In a vertical scanning period for a memory-data display, the memory-data read-control signal MEM 1 is set to high level (hereinafter referred to as "H" level), and after a period of 1H from a rise thereof, the memory-data read-control signal MEM 2 is set to "H" level. Then, in the first vertical driving circuit 12, the scanning signal GATE is set to "L" level by the memory-data read-control signal MEM1, and after a period of 1H, the data-read control signal drGATE is set to "H" level by the memory-data read-control signal MEM2.

When the data-read control signal drGATE is set to "H" level, the data-read switch 27 is turned on, so that data held in the memory circuit 25 (memory data) is read via the data-read buffer 26 with a delay of 1H from the timing of scanning by the scanning signal GATE. At this time, by the operation of the data-read switch 27, a potential Cs or Xcs, the polarity being inverted at a cycle of 1H (or 1F), is written to the liquid crystal cell unit as a pixel potential. At this time, no change occurs in the operation of the second vertical driving circuit 13.

The first driving circuit 12 drives the pixel circuits in synchronization with shift operations of the shift register implemented by the cascaded D-FFs 41. Thus, a combined display of an analog-signal display and a memory-data display is allowed since a boundary scanning line between a display region for writing an analog signal and a display region for writing memory data can be defined by timings of the memory-data read-control signals MEM1 and MEM2.

Figure 11:
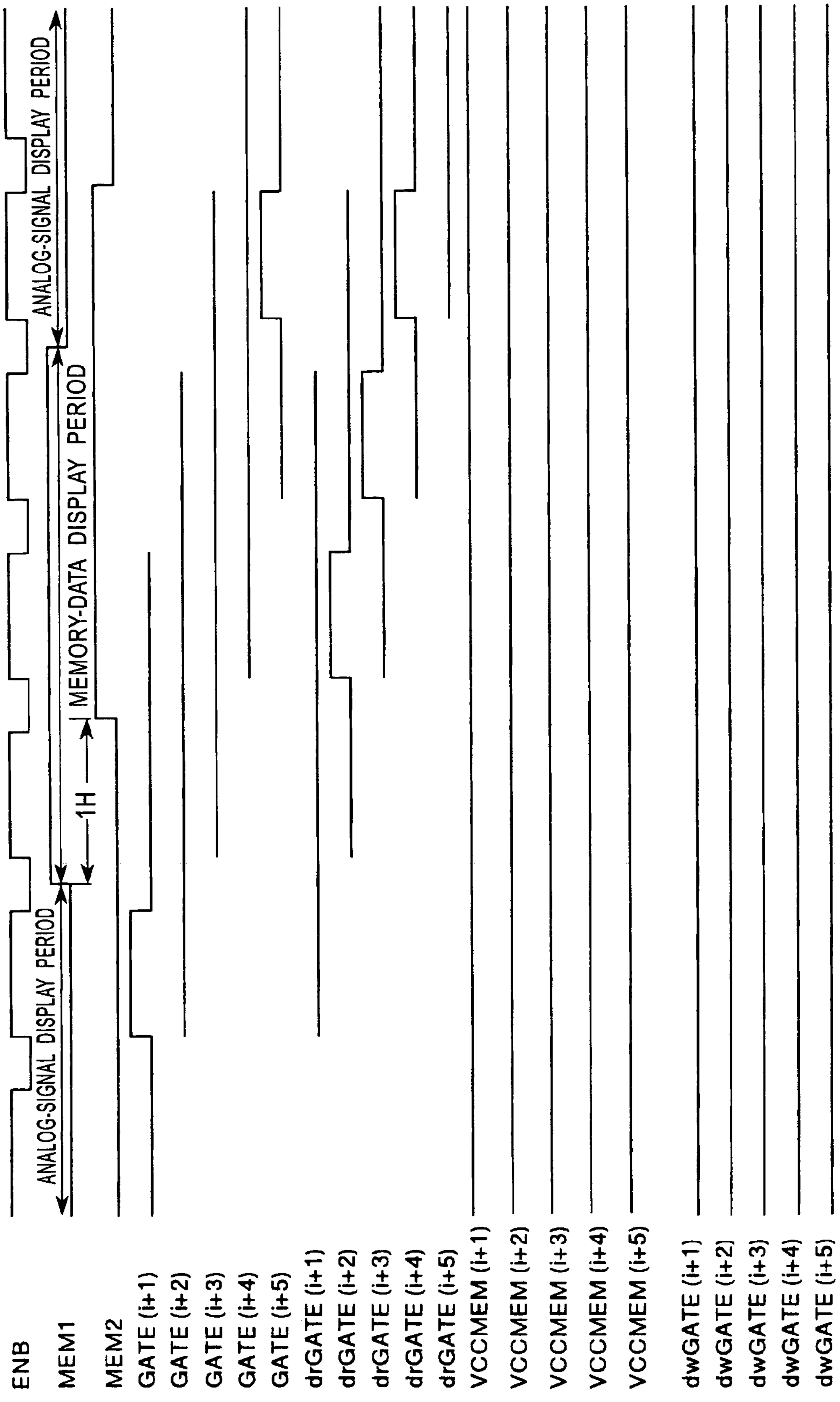
FIG. 11 is a timing chart for holding of memory data in a combined display of an analog-signal display and a memory-data display.

Furthermore, in this embodiment, as is apparent from the timing chart shown in FIG. 11, the data-read control signal drGATE(i+4) of the (i+4)-th row is generated at the same timing as the scanning signal GATE(i+5) of the (i+5)-th row is generated. That is, the scanning signal GATE(i+5) of the (i+5)-th row and the data-read control signal drGATE(i+4) of the (i+4)-th row are set to "H" level at the same timing.

By setting timing relationships as described above, in driving for a memory-data display, even if memory data is read and written to the liquid crystal cell unit after a period of 1H from a timing of pixel selection in an analog-signal display, i.e., from a timing of writing image data to the memory circuit 25, a memory-data display for the (i+4)-th row and an analog-signal display for the (i+5)-th row are allowed at the same time when switching from the memory-data display to the analog-signal display. Thus, the last one line of the memory-data display, i.e., the (i+4)-th row, is displayed for sure.

Finally, an operation for writing memory data will be described with reference to the timing chart shown in FIG. 12. First, in a period of writing digital image data to the memory circuit 25, the memory-data write-control signal WE is set to "H" level. The timing of the memory-data write-control signal WE can be arbitrarily set, and thus is not shown in the timing chart shown in FIG. 12.

In the second vertical driving circuit 13, when the memory-data write-control signal WE is set to "H" level, data-write control signals dwGATE are sequentially output in synchronization with transfer operations of the shift register implemented by the cascaded D-FFs 61. Thus, in the pixel circuit including the memory, shown in FIG. 2, the data-write switch 24 is turned on, so that digital image data is written to the memory circuit 25 via the signal line 16-i.

This sequence allows image data to be written to the memory circuit 25 and image data to be read from the memory circuit 25 within 1F (one field) period.

The holding voltage for memory data in the memory circuit 25 is the panel-circuitry power supply VDD. When image data is written to the memory circuit 25, as described earlier in relation to the operations of the first example of the pixel circuit, the positive power-supply voltage VCCMEM is once lowered from VDD level to the memory-data voltage at the VCC level. At that time, it takes time for the positive power-supply voltage VCCMEM to shift from VDD level to VCC level due to the effect of characteristics of circuit elements.

If it takes time for the positive power-supply voltage VCCMEM to shift from VDD level to VCC level, in the case of the example described earlier, image data is input to the memory circuit 25 while the positive power-supply voltage VCCMEM is being shifted from 7 V to 3 V. For example, if the positive power-supply voltage at that time is 5 V, the data becomes indeterminate, causing a current to flow through the memory circuit 25 (SRAM in the example circuit shown in FIG. 3).

In order to prevent this problem, in this embodiment, the positive power-supply voltage VCCMEM of the memory circuit 25 is controlled as will be described below. The control is executed by the second vertical driving circuit 13. A specific control sequence will be described below.

Figure 12:
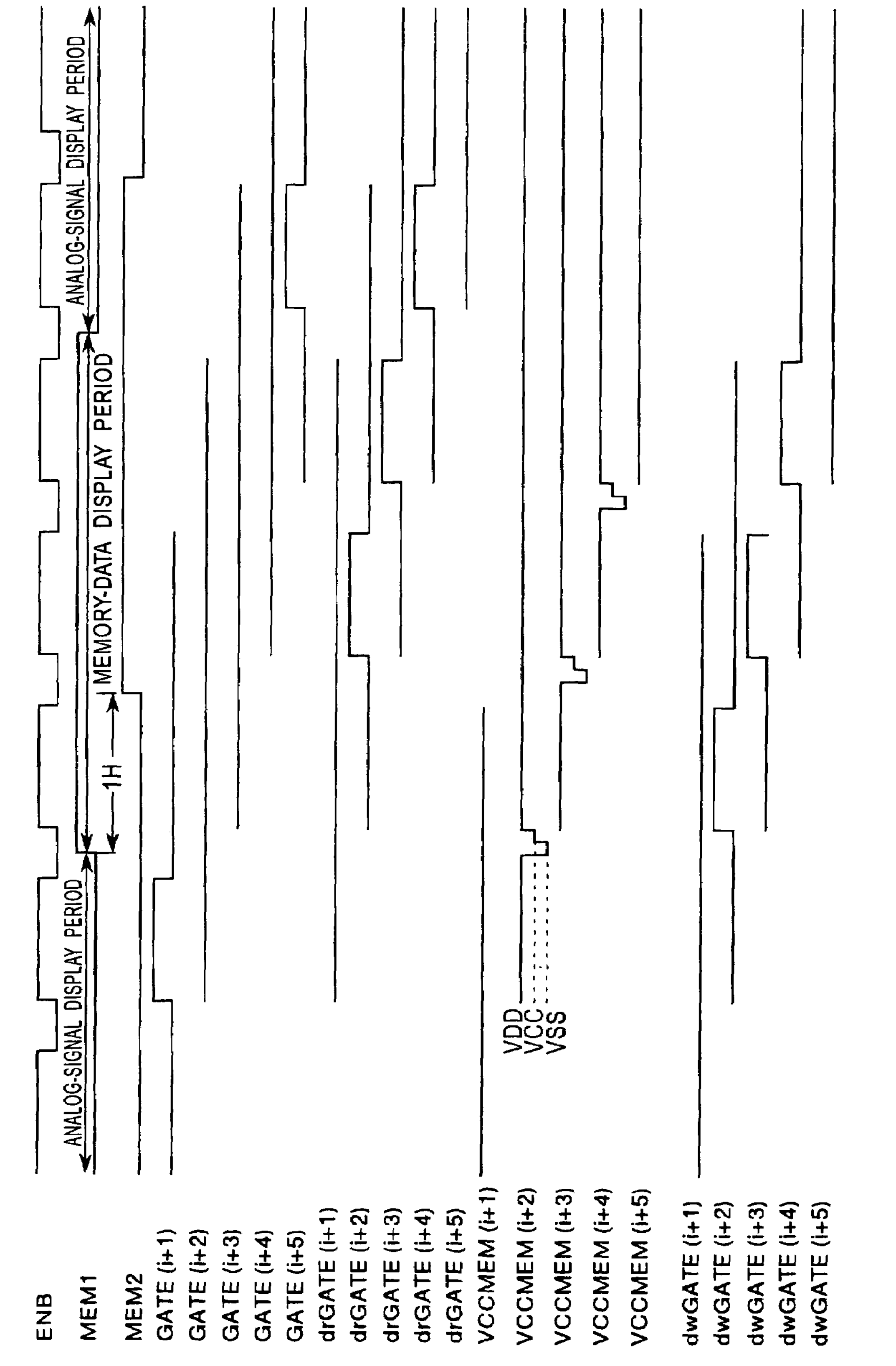
FIG. 12 is a timing chart for writing of memory data in a combined display of an analog-signal display and a memory-data display.

As shown in the timing chart shown in FIG. 12, when the memory-data write-control signal WE for requesting writing of image data is set to "H" level, in the second vertical driving circuit 13, the power-supply switch 74 selects GND (VSS) level in response to an output of the R-S flip-flop 68, whereby the positive power-supply voltage VCCMEM is once lowered from VDD level to VSS level. Then, the power-supply switch 74 selects VCC level in response to an output of the inverter 75, whereby the positive power-supply voltage VCCMEM is shifted from VSS level to VCC level. The image data is written to the memory circuit 25 at VCC level, and then the positive power-supply voltage VCCMEM is restored to VDD level.

As described above, when image data is written to the memory circuit 25, the positive power-supply voltage VCC-MEM of the memory circuit 25 is once lowered forcibly from VDD level to a level (VSS level in this example) lower than VCC level and then set to VCC level. Thus, the time it takes for the positive power-supply voltage VCCMEM to shift from VDD level to VCC level is considerably reduced. Accordingly, image data is prevented from being input to the memory circuit 25 before the positive power-supply voltage VCCMEM has fully been lowered to VCC level. Thus, data is prevented from being indeterminate, and flow of a passing current associated with indeterminate data is prevented.

In order to implement the vertical driving system having the functions described above, a large number of logic circuits is needed, as is apparent form the example circuits of the first vertical driving circuit 12 and the second vertical driving circuit 13. This results in a large number of circuit elements and an extremely large circuitry scale. When a liquid crystal display is used as an output display of a portable terminal, for example, a cellular phone, the output display is disposed typically at a center of the body of the cellular phone. Since bodies of cellular phones are becoming smaller and smaller every year, it is desired in a liquid crystal display that the periphery of the pixel region (effective screen), or what is called a frame, be reduced in size.

In view of this situation, in the liquid crystal display according to this embodiment, as is apparent from FIG. 1, the vertical driving system is divided into the first and second vertical driving circuits 12 and 13, and the layout is such that the vertical driving circuits 12 and 13 are disposed separately on the left and right sides of the pixel region 11. Thus, the pattern layout of the vertical driving system is efficient using both sides of the pixel region (effective screen) 11, allowing the frame of the liquid crystal display panel to be narrower.

In particular, in the circuit examples described hereinabove, the first vertical driving circuit 12 is in charge of driving the scanning line 15-i and the data-read control line 29-i, and the second vertical driving circuit 13 is in charge of driving the data-write control line 28-i and the power-supply control line 30-i. Thus, the scanning signal GATE for driving the scanning line 15-i and the data-read control signal drGATE for driving the data-read control line 29-i, and the data-write control signal dwGATE for driving the data-write control signal 28-i and the power-supply voltage VCCMEM for driving the power-supply control line 30-i are associated with each other in operation. Thus, the circuits can be shared between the signals, serving to simplify the configurations of the first and second vertical driving circuits.

Figure 13:
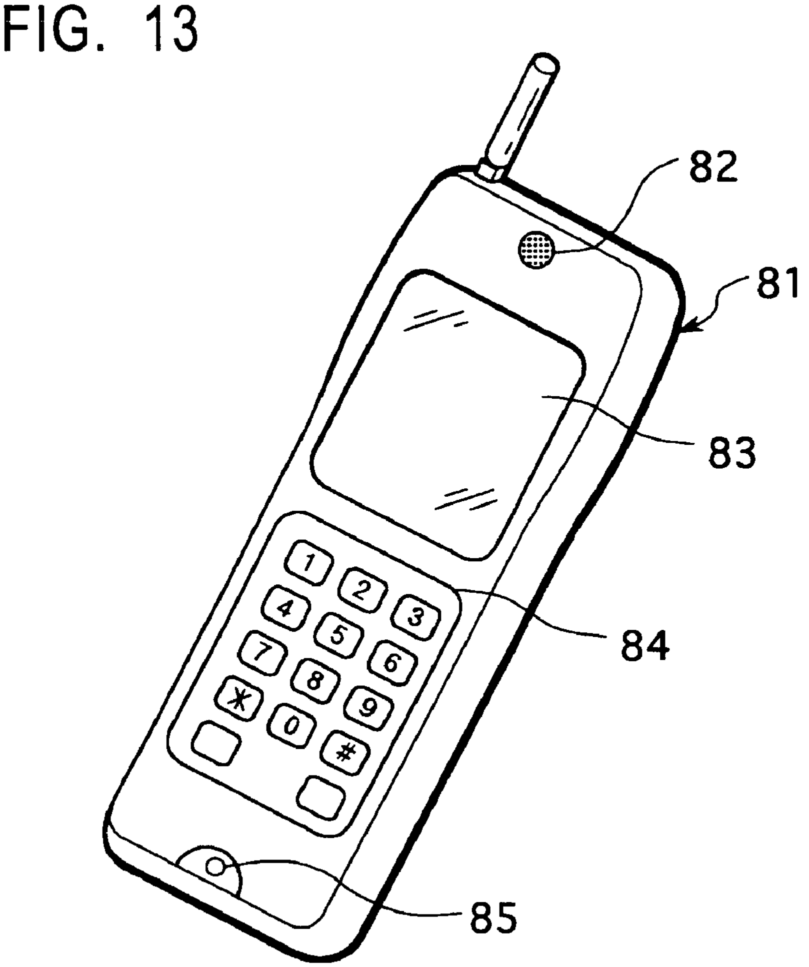
FIG. 13 is an external view showing a schematic construction of a cellular phone according to the present invention.

FIG. 13 is an external view showing a schematic construction of a portable terminal, for example, a cellular phone, according to the present invention.

The cellular phone in this example has, on a front side of an apparatus case 81, a speaker 82, an output display 83, an operation unit 84, and a microphone 85, disposed in that order from an upper side. In the cellular phone constructed as described above, a liquid crystal display is used in the output display 83, and the liquid crystal display is implemented by the liquid crystal display according to the embodiment described earlier.

Figure 14:
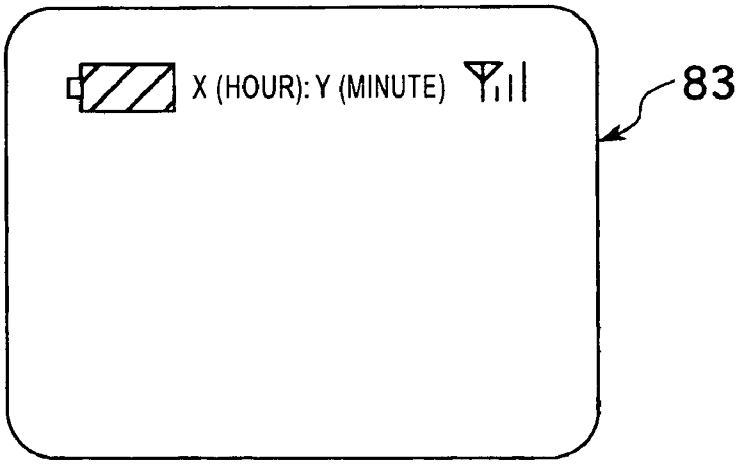
FIG. 14 is a diagram showing an example display on an output display.

The output display 83 in such a cellular phone has a partial display mode as a display function in a standby mode or the like, in which an image is displayed only in a partial region in the vertical direction of the screen. As an example, in the standby mode, information such as the remaining battery capacity, reception sensitivity, and time is constantly displayed in a partial region of the screen, as shown in FIG. 14. The remaining display area is displayed, for example, in white (or black).

In the cellular phone having the output display 83 with a partial display function as described above, the liquid crystal display according to the embodiment described earlier is used as the output display 83, and a memory-data display is performed in the partial display mode. Thus, reduction in power consumption is allowed since charging and discharging of signal lines are not needed, allowing usage over a longer period by a single charging of a battery serving as a main power supply.

In particular, since the effect of a pixel potential is avoided when image data is written to the memory circuits provided for the respective pixel circuits, serving to provide a large margin against variation in characteristics of transistors forming the pixel circuits. Accordingly, variation in picture quality due to variation in the transistor characteristics does not exist, serving to provide pictures in high quality.

Furthermore, since the layout of the vertical driving system is such that the first and second vertical driving circuits 12 and 13 are disposed separately on the left and right sides, the frame of the liquid crystal display panel can be made narrower. Thus, when the liquid crystal display is mounted on the apparatus case 81 of a predetermined size, the effective screen size can be increased owing to the narrower frame of the liquid crystal display panel. Conversely, if the effective screen size is predetermined, the size of the apparatus case 81 can be reduced owing to the narrower frame of the liquid crystal display panel.

Although the description has been made in the context of a cellular phone as an example, without limitation thereto, application to portable terminals in general, including a cordless handset of an extension telephone set, and a PDA, is possible.

INDUSTRIAL APPLICABILITY

As described hereinabove, according to the present invention, in a pixel circuit including a memory, separate paths are provided for writing a digital image signal to the memory and for reading a digital image signal from the memory. Thus, when a digital image signal is written to the memory, the writing operation is not affected by a pixel potential. Accordingly, a large margin is provided against variation in characteristics of transistors forming the pixel circuit, serving to avoid variation in picture quality due to variation in the characteristics of the transistors.

The invention claimed is:

1. A liquid crystal display comprising a plurality of pixel circuits including liquid crystal cell units, arranged to form a matrix on a substrate and vertical driving means for selectively driving the plurality of pixel circuits on a row-by-row basis, wherein each of the plurality of pixel circuits comprises:

a memory for holding a digital image signal;

a write switch for writing to the memory a digital image signal fed from a signal line wired on a column-by-column basis;

a read buffer for reading the digital image signal held in the memory and writing the digital image signal to the liquid crystal cell unit;

a pixel select switch for writing an analog image signal fed via the signal line to the liquid crystal cell unit in synchronization with vertical scanning;

a read switch that cause a high-impedance state between an output terminal of the read buffer and the liquid crystal cell unit after completion of writing of the digital image signal from the memory to the liquid crystal cell unit by the read buffer;

wherein the vertical driving means comprises first and second driving means being disposed on both sides of the pixel region, for driving in a shared manner a plurality of wires connected to the plurality of pixel circuits on a row-by-row basis, including a scanning line for feeding a driving signal to the pixel-select switch, a write-control line for feeding a driving signal to the write switch, a read-control line for feeding a driving signal to the read switch, and a power-supply control line for controlling a power-supply voltage that is fed to the memory circuit, wherein the first driving means is in charge of driving the scanning line and the read-control line, and wherein the second driving means is in charge of driving the write-control line and the power-supply control line.

2. A liquid crystal display according to claim 1, wherein the first driving means, when switching from a first display mode based on the digital image signal read from the memory circuit to a second display mode based on the analog image signal, sets timing of driving the read switch in a pixel circuit on a final row in the first display mode to the same timing as timing of driving the pixel-select switch in a pixel circuit on a first row in the second display mode.

3. A liquid crystal display according to claim 1, wherein the second driving means supplies a circuit power-supply voltage that is used in the pixel circuit to the memory circuit as a holding voltage.

4. A liquid crystal display according to claim 3, wherein the second driving means once lowers the power-supply voltage fed to the memory circuit via the power-supply control line from the circuit power-supply voltage to a potential of the signal line when the digital image signal is written to the memory circuit, and restores the power-supply voltage to the circuit power-supply voltage after completion of the writing.

5. A liquid crystal display according to claim 4, wherein the second driving means first lowers the power supply voltage fed to the memory circuit via the power-supply control line to a potential lower than the potential of the signal line when the digital image signal is written to the memory circuit, and then sets the power-supply voltage to the potential of the signal line.

6. A liquid crystal display, comprising a plurality of pixel circuits including liquid crystal cell units, arranged to form a matrix on a substrate, wherein each of the plurality of pixel circuits comprises:

a memory for holding a digital image signal;

a write switch driven by a write-control signal for writing to the memory a digital image signal fed from a signal line wired on a column-by-column basis; and a read buffer driven by a read-control signal for reading the digital image signal held in the memory and writing the digital image signal to the liquid crystal cell unit; and wherein the read buffer converts the digital image signal read from the memory into a constant potential whose polarity is inverted in synchronization with an opposing potential of the liquid crystal cell unit whose polarity is inverted on a line-by-line (or field-by-field) basis, and supplies the constant potential to the liquid crystal cell unit as a pixel potential.

7. A liquid crystal display according to claim 6, wherein each of the plurality of pixel circuits comprises a read switch for causing a high-impedance state between an output terminal of the read buffer and the liquid crystal cell unit after completion of writing of the digital image signal from the memory to the liquid crystal cell unit by the read buffer.

8. A liquid crystal display according to claim 6, comprising vertical driving means for selectively driving the plurality of pixel circuits on a row-by-row basis, wherein the vertical driving means comprises first and second driving means for driving, in a shared manner, a plurality of wires connected to the plurality of pixel circuits on a row-by-row basis, the first and second driving means being disposed on both sides of the pixel region.

9. A liquid crystal display according to claim 8, wherein each of the plurality of pixel circuits comprises:

a pixel-select switch for writing an analog image signal fed via the signal line to the liquid crystal cell unit in synchronization with vertical scanning; and a read switch that causes a high-impedance state between an output terminal of the read buffer and the liquid crystal cell unit after completion of writing of the digital image signal from the memory to the liquid crystal cell unit by the read buffer.

10. A portable terminal comprising an output display having a partial display mode in which an image is displayed only in a partial region of a screen, wherein a liquid crystal display is used as the output display, the liquid crystal display comprising a plurality of pixel circuits arranged to form a matrix on a substrate, each of the plurality of pixel circuits including a liquid crystal cell unit, a memory for holding a digital image signal, a write switch driven by a write-control signal for writing to the memory a digital image signal fed from a signal line that is wired on a column-by-column basis, and a read buffer driven by a read-control signal for reading the digital image signal held in the memory and writing the digital image signal to the liquid crystal cell unit wherein the liquid crystal display comprises vertical driving means for selectively driving the plurality of pixel circuits on a row-by-row basis, and wherein the vertical driving means comprises first and second driving means for driving, in a shared manner, a plurality of wires connected to the plurality of pixel circuits on a row-by-row basis, the first and second driving means being disposed on both sides of the pixel region.

* * * * *